March 24, 1964   A. A. LEBERMANN   3,125,837
SELF ALIGNING ARBOR
Filed Nov. 7, 1961

INVENTOR.
August A. Lebermann
BY
Christian R. Nielsen
Attorney

United States Patent Office 3,125,837
Patented Mar. 24, 1964

3,125,837
SELF ALIGNING ARBOR
August A. Lebermann, Gardena, Calif.
(29001 Hogan Drive, Sun City, Calif.)
Filed Nov. 7, 1961, Ser. No. 150,751
1 Claim. (Cl. 51—237)

This invention relates to a self aligning arbor for use in aligning the cylindrical body thereof with the tool carriage and the work holder of metal working machines, and it consists in the constructions, arrangements and combinations herein described and claimed.

It is the cardinal object of the invention to provide a self aligning arbor wherein means are provided which are cooperable with a chuck or collet for universally adjusting the cylindrical body portion thereof with respect to the usual spring loaded tail stock center and thereby reduce strains thereon as well as insuring true alignment of the arbor.

Additional objects, advantages and features of invention will be apparent from the following description considered in conjunction with the accompanying drawing, wherein FIGURE 1 is a front elevation of a portion of a metal working machine having my arbor installed between the chuck and tail stock.

Figure 1:
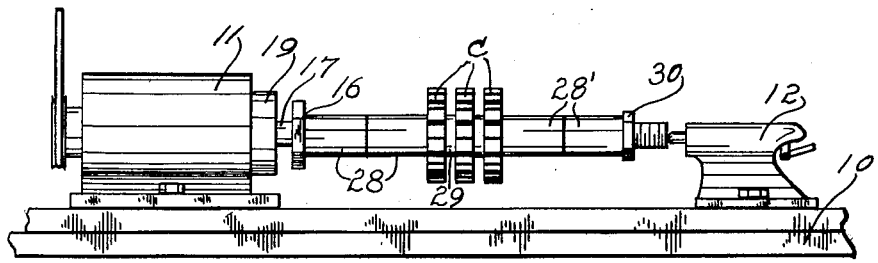

Reference is first made to FIGURE 1 of the drawing, wherein there is shown a portion of a table of a grinder 10 upon which there is mounted, as is customary, a chuck 11 and tail stock 12, the chuck and tail stock being of conventional construction, the former having jaws for gripping one end of an arbor 13 and the latter having a spring loaded center for engaging the other end of the arbor.

In the present instance, the arbor is shown as supporting a plurality of milling cutters C, the teeth of which are to be sharpened by a conventional grinder, not shown.

Figure 2:
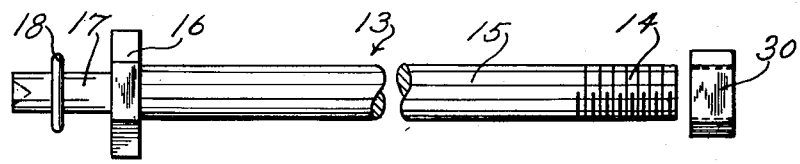
FIGURE 2 is a plan view of the arbor.
Figure 3:
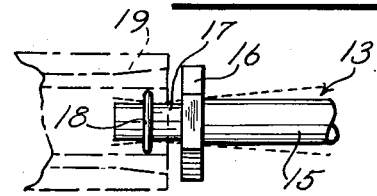
FIGURE 3 is a fragmentary elevation of an end of the arbor illustrating by dotted lines, the universal movement of the arbor within a chuck or collet.
Figure 4:
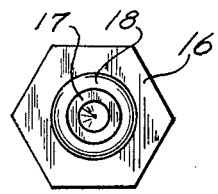
FIGURE 4 is an enlarged end view thereof.

As best seen in FIGURE 2, the arbor 13 has a threaded end 14, a cylindrical body portion 15 and an enlarged hexagonal body 16 formed integrally with the cylindrical body at the end opposite the threaded end 14. Beyond the hexagonal body 16, there is an extension 17 of reduced diameter which is provided with an enlarged annular collar 18, the outer periphery of which is formed with a radial contour adapted to be engaged within a chuck or collet 19. It will be noted that the collar 18 is located intermediate the length of the extension 17 and therefore spaced from the hexagonal body 16 permitting the collar to be gripped by the chuck with ample clearance with respect to the hexagonal member 16 so that the arbor may readily align itself with respect to the tail stock 12 and a work head.

Figure 5:
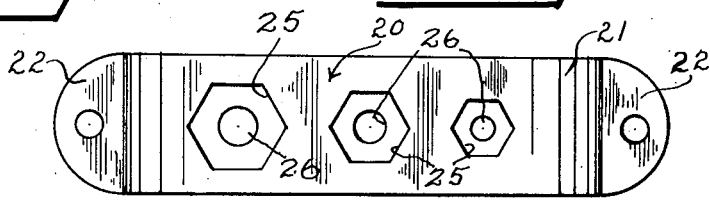
FIGURE 5 is a top plan view of a supporting base for a plurality of different sized arbors.
Figure 6:
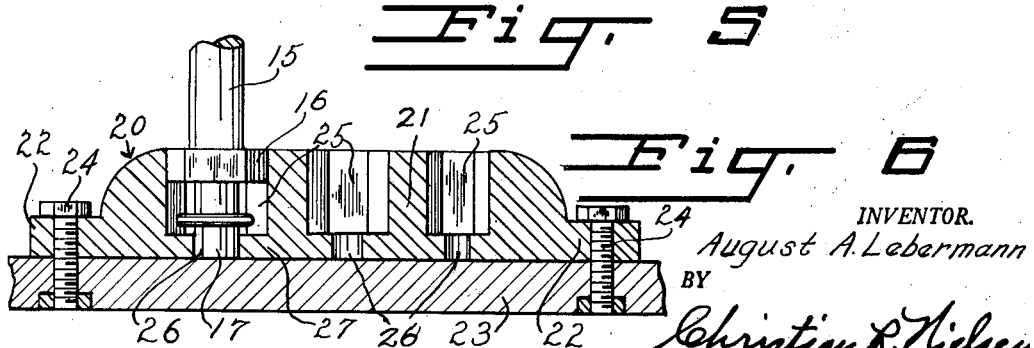
FIGURE 6 is a longitudinal sectional view of FIGURE 5 illustrating the manner in which the arbors are supported by the base.

In FIGURES 5 and 6 there is shown an arbor support and holding means generally indicated by the reference character 20. The support comprises an elongated base 21 having apertured flanges 22 for securing the base to a table or the like 23 by means of bolts 24. The top face of the base 21 is formed with a plurality of hexagonal passages 25 of varying sizes to accommodate hexagonal bodies 16 of different sized arbors, which may be employed in grinding machines. An opening 16 is formed in the base wall 27 which is concentratic with the passage 25, for seating engagement of the outer portion of the extension 17 when the arbors are disposed in the passages 25. It will be seen that the arbors 15 will be supported in an upright position, although the support may be mounted in a manner to support the arbors horizontally, for cutter assembling purposes, and when it is desired to assemble the milling cutters C upon an arbor, a suitable number of spacer collars 28 are adjusted in end to end relation upon the selected arbor, the first collar seating against the hexagonal body 16. The first cutter C is then positioned upon the arbor 15 in abutting relation with the next adjacent collar. A spacing collar 29 is positioned on the arbor interposed between said cutter and a following cutter to be mounted on the arbor. This procedure is continued until all cutters have been mounted and spaced on the arbor, collars 28' are mounted upon the arbor in end to end relation, one collar abutting the last milling cutter. The teeth of the milling cutters are longitudinally aligned and a nut 30 is then engaged upon the threaded end 14 of the arbor and tightened to hold the milling cutters properly upon the arbor. The arbor and assembled cutters may then be removed from the support 20 and installed between the tail stock 12 and the chuck or collet 19 for grinding operations.

The work head of the grinder may be set to one or more positions, as is customary, and when resetting the head to zero position there is no assurance that the spindle of the work head will be in perfect alignment with the tail stock center, but by virtue of the radial and universal adjustment of the arbor within the chuck or collet, a true alignment of the arbor with the tail stock center is attained, since the radial contour of the annular collar 18 permits self aligning of the arbor. An objectional strain on the workhead spindle could be caused if extension 17 without the collar 18 was engaged in the chuck or collet and the other end of the arbor supported by the tail stock.

While I have shown and described a preferred form of the device, this is by way of illustration only, and I consider as my own all such modifications in construction as fairly fall within the scope of the appended claim.

I claim:

A self aligning arbor comprising a main cylindrical body adapted to be operatively engaged between a spring loaded tail stock center and a chuck, said cylindrical body having means for securing work to be rotated, the end of the arbor engaged in the chuck being of less diameter than the main cylindrical body and having an enlarged annular collar integral with the arbor and positioned inwardly of the reduced end adapted to be gripped by said chuck, and said collar having a radial peripheral surface whereby a universal movement between the chuck and said surface is attained insuring true alignment with said tail stock to lessen strain thereon.

References Cited in the file of this patent
UNITED STATES PATENTS

| | | |
|---|---|---|
| 308,639 | Stevens | Dec. 2, 1884 |
| 1,109,625 | Cooper | Sept. 1, 1914 |
| 1,839,835 | Cook | Jan. 5, 1932 |
| 1,854,618 | McGrady | Apr. 19, 1932 |
| 2,356,678 | Majors | Aug. 22, 1944 |